(12) United States Patent
Franz et al.

(10) Patent No.: US 11,255,439 B2
(45) Date of Patent: Feb. 22, 2022

(54) AXIAL SHAFT SEAL RING AND SEAL ARRANGEMENT

(71) Applicant: Trelleborg Sealing Solutions Germany GmbH, Stuttgart (DE)

(72) Inventors: Martin Franz, Wannweil (DE); Christoph Schuele, Boeblingen (DE); Christoph Wehmann, Stuttgart (DE)

(73) Assignee: Trelleborg Sealing Solutions Germany GmbH, Stuttgart (DE)

( * ) Notice: Subject to any disclaimer, the term of this patent is extended or adjusted under 35 U.S.C. 154(b) by 93 days.

(21) Appl. No.: 16/946,980

(22) Filed: Jul. 14, 2020

(65) Prior Publication Data

US 2020/0340589 A1  Oct. 29, 2020

Related U.S. Application Data

(63) Continuation of application No. PCT/EP2019/051594, filed on Jan. 23, 2019.

(51) Int. Cl.
*F16J 15/34* (2006.01)
*F16J 15/16* (2006.01)

(52) U.S. Cl.
CPC ......... *F16J 15/3456* (2013.01); *F16J 15/164* (2013.01)

(58) Field of Classification Search
CPC .. F16J 15/16; F16J 15/164; F16J 15/18; F16J 15/32; F16J 15/3204; F16J 15/3456
See application file for complete search history.

(56) References Cited

U.S. PATENT DOCUMENTS

| 2,646,999 A | | 7/1953 | Barske | |
|---|---|---|---|---|
| 3,022,081 A | * | 2/1962 | Thomas | F16J 15/3256 277/353 |
| 3,664,675 A | * | 5/1972 | Malmstrom | F16J 15/3456 277/400 |
| 4,311,315 A | * | 1/1982 | Kronenberg | F16J 15/3456 277/397 |

(Continued)

FOREIGN PATENT DOCUMENTS

| DE | 343 813 C | 7/1952 |
|---|---|---|
| DE | 32 01 556 U1 | 4/1992 |
| GB | 2 369 412 A | 5/2002 |

*Primary Examiner* — Gilbert Y Lee
(74) *Attorney, Agent, or Firm* — Hackler Daghighian Martino & Novak

(57) ABSTRACT

An axial shaft seal ring has a holding portion and a sealing portion, which are connected to one another via an elastically deformable sealing membrane. The sealing membrane has a plurality of spatial structure areas R in the circumferential direction of the shaft seal ring, which serve as a circumferential reserve of the sealing membrane. As a result of a centrifugal force $F_R$ accompanying a rotational movement of the shaft seal ring around the central axis thereof and acting on the sealing membrane, an expansion of the sealing membrane in a radial direction is effected at least in the spatial structure areas, in such a manner that the sealing portion is acted upon by the sealing membrane with an axially directed pull force $F_Z$, which is directed opposite to the pressing force $F_A$.

15 Claims, 8 Drawing Sheets

(56) References Cited

U.S. PATENT DOCUMENTS

| | | | | |
|---|---|---|---|---|
| 4,943,068 A | * | 7/1990 | Hatch | F16J 15/3256 277/353 |
| 4,962,936 A | * | 10/1990 | Matsushima | F16J 15/3256 277/364 |
| 2003/0006563 A1 | | 1/2003 | Cater et al. | |

* cited by examiner

AXIAL SHAFT SEAL RING AND SEAL ARRANGEMENT

CROSS-REFERENCE TO RELATED APPLICATIONS

This continuation application claims priority to PCT/EP2019/051594 filed on Jan. 23, 2019 which has published as WO 2019/145344 A1 and also the German application number 10 2018 201 291.1 filed on Jan. 29, 2018, the entire contents of which are fully incorporated herein with these references.

DESCRIPTION

Field of the Invention

The invention relates to an axial shaft seal ring and a sealing arrangement having such an axial shaft seal ring.

Background of the Invention

Generally, axial shaft seal rings (Axial-Wellendichtringe, AWDR) are employed in practice for subordinate sealing tasks. Axial shaft seal rings often serve as protection against dust or splash water. Contrary to the so-called radial shaft seal rings (Radial-Wellendichtringen, RWDR), the dynamic sealing portion of the axial shaft seal ring does not abut the shaft, but usually a housing part in an axial direction to the central axis of the seal ring.

Known constructions are the so-called V-ring and the gamma ring, which additionally performs a labyrinth function.

At rotational speeds of up to 40,000 rpm, which can easily be reached by the drive shafts of modern electric motors, for example in motor vehicles or machine tools, the axial shaft seal rings are subject to enormous mechanical and thermal load. This can significantly shorten the lifespan of the shaft seal rings.

It is therefore the object of the invention to provide an axial shaft seal ring as well as a sealing arrangement having such an axial shaft seal ring which have an improved lifetime even at the mentioned high rotational speeds.

SUMMARY OF THE INVENTION

The object relating to the axial shaft seal ring is solved by an axial shaft seal ring having the features of the independent claim. Preferred embodiments of the invention are the object of the subclaims and the description.

The axial shaft seal ring according to the invention has a holding portion that can be arranged in a statically sealing manner on a shaft that can rotate around a rotational axis. A sealing portion of the axial shaft seal ring serves for dynamic sealing abutment against a sealing surface in an axial direction to the central axis of the axial shaft seal ring. The axial shaft seal ring encircles the central axis, in such a manner that the central axis of the axial shaft seal ring coincides with the rotational axis thereof when the axial shaft seal ring is in the mounted state on the shaft. The holding portion and the sealing portion are connected to one another via an elastically deformable sealing membrane, which extends from the holding portion in a radial direction outwards towards the sealing portion. When the axial shaft seal ring is in the mounted state on the shaft, the sealing portion can be pretensioned against the sealing surface by the sealing membrane with a pressing force $F_A$. When the axial shaft seal ring is in the mounted state, the sealing membrane therefore serves as a tensioning member for the sealing portion. According to the invention, the sealing membrane has a plurality of spatial structure areas in the circumferential direction of the shaft seal ring, which serve as a circumferential reserve of the sealing membrane. As a result of a centrifugal force, which is accompanied by a rotational movement of the shaft seal ring around the central axis thereof and which acts on the sealing membrane, according to the invention an expansion of the sealing membrane in a radial direction relative to the sealing portion is effected at least in the spatial structure areas of the sealing membrane, in such a manner that the sealing portion can be subjected to an axially directed pull force $F_Z$ through the sealing membrane. The dynamically sealing portion of the axial shaft seal ring can thereby be relieved of load dependent on the rotational speed of the axial shaft seal ring around the central axis thereof, i.e. rotational speed dependent. Depending on the layout of the axial shaft seal ring, the sealing portion can even be detached from the respectively assigned sealing surface, i.e. moved away in the axial direction. As a result, mechanical and thermal overstressing of the sealing portion can be reliably counteracted, even in application cases with extremely high rotational speeds of the shaft. The sealing portion of the axial shaft seal ring according to the invention does not have to deform or be able to deform itself at the rotational speeds or circumferential speeds of the axial shaft seal ring occurring during operational use of the axial shaft seal ring, so the material of the sealing portion can be selected primarily depending on the respective sealing requirements. To this extent, the sealing portion of the axial shaft seal ring can easily be made of a viscoplastic material, for example PTFE (polytetrafluoroethylene), or of a material which is dimensionally stable or substantially dimensionally stable compared to the sealing membrane, such as metal or a (technical) ceramic. The sealing membrane can be made of a viscoplastic or rubber-elastic deformable material. In principle, the standard materials familiar to the person skilled in the art, such as acrylonitrile-butadiene rubber or silicone, EPDM (ethylene propylene-diene rubber), FKM (fluorocarbon rubber) or HNBR (hydrogenated acrylonitrile-butadiene rubber) are particularly suitable here.

The spatial structure areas of the sealing membrane serving as a circumferential reserve can be arranged in the circumferential direction of the shaft seal ring, preferably regularly, at a distance from each other or arranged directly adjacent one behind the other. The axial shaft seal ring according to the invention has a wide range of applications and can be used particularly in medicine, process technology, machine tools and also in mobile applications. Due to the inherent speed-dependent self-relief of the sealing portion thereof, the axial shaft seal ring according to the invention is predestined for sealing tasks with shafts rotating at rotational speeds of up to 40,000 rpm.

The sealing membrane can have a uniform, i.e. even, wall thickness over the entire extension thereof or substantially over the entire extension thereof. This offers technical production advantages.

According to a preferred embodiment of the invention, the spatial structure areas of the sealing membrane serving as circumferential reserve comprise membrane folds of the sealing membrane. The membrane folds are preferably arranged so as to extend axially or strictly axially. If the sealing membrane is made of a thermoplastic material, material weaknesses, for example in the shape of constrictions in the area of edges of the sealing membrane, can facilitate the desired centrifugally induced deformability of the sealing membrane. As a result, the wall thickness of the sealing membrane and therefore the mass thereof can be increased without having to accept too many restrictions regarding the deformability thereof.

The spatial structure areas of the sealing membrane may comprise indentations and/or bulges of the sealing membrane according to a preferred embodiment of the invention. The indentations or bulges can have a polygonal or an elliptical, in particular oval, or a circular basic shape.

Particularly preferred, compared to the sealing membrane, the sealing portion is dimensionally stable (in itself) or is stabilized in the shape thereof with respect to the centrifugal forces $F_R$ occurring during operational use of the axial shaft seal ring. The former can be achieved, for example, by having the sealing portion made of a material having a large modulus of elasticity compared to the material of the sealing membrane.

In order to stabilize the shape of the sealing portion, the shaft seal ring may, according to an embodiment of the invention, comprise a support ring by which radial expansion of the sealing portion during operational use of the shaft seal ring is limited or prevented. This means that the sealing portion is stiffened by the support ring against radial expansion. According to invention, the support ring can surround the sealing portion on the outside in the radial direction. The sealing portion can be formed onto the support ring, in particular injection-molded, or glued on. Alternatively, the sealing portion can be arranged in the support ring with a press fit. Particularly preferred, the sealing portion and the support ring are designed as a two-component injection-molded part (2K). The support ring can be made of a plastic material, of metal or of a composite material.

If the support ring surrounds the sealing membrane of the axial shaft seal ring, the support ring can form a support or stop surface for the sealing membrane. This allows the centrifugal force-induced deformation of the sealing membrane in the radial direction to be limited. In this case the support ring therefore has a double function.

The holding portion, the sealing membrane and the sealing portion of the axial shaft seal ring may be formed integrally with one another according to a preferred embodiment of the invention. This means that the axial shaft seal ring can be produced cost-effectively by means of an injection-molding method. This offers cost advantages, particularly in the mass production of the axial shaft seal ring, and enables low overall production tolerances.

The sealing portion of the axial shaft seal ring can have one or a plurality of sealing edges. This means that the sealing capacity of the axial shaft seal ring can be adjusted to suit the requirements.

According to a preferred further embodiment of the invention, the sealing membrane, preferably in the radial direction on the inside, is provided with only one mass member or with a plurality of mass members arranged in a ring-shape around the central axis, by which the radial expansion of the sealing membrane is supported during a rotational movement of the shaft seal ring. According to the invention, the only one mass members can be designed particularly in a ring-shape.

Each mass member is advantageously glued to, welded to or pressed into the sealing membrane. Alternatively, each mass member can also be fastened to the sealing membrane on the outer circumference, especially glued. As a result, the response of the sealing membrane to centrifugal forces derived from the rotational movement of the axial shaft seal ring can be further improved. If required, the sealing membrane can therefore also be made with a greater wall thickness and/or a more viscoplastic material. Alternatively, the sealing membrane can be implemented in a foil-like manner with a very small, i.e. minimized, wall thickness.

The holding portion of the axial shaft seal ring can comprise a tensioning or holding ring for a reliable (static) sealing fit on the shaft. For example, the holding ring can be arranged embedded in the material of the holding portion or glued to the holding portion. The holding portion on the holding ring may also be injection-molded.

The sealing arrangement according to the invention comprises a shaft housing and a shaft which is rotatable relative to the shaft housing around a rotational axis, as well as an axial shaft seal ring described above. A sealing gap formed between the shaft housing and the shaft is sealed by the axial shaft seal ring. The axial shaft seal ring is mounted non-rotatably on the shaft and the sealing portion thereof abuts against a sealing surface of the shaft housing in an axial direction to the central axis of the shaft seal ring, preferably pretensioned. It is understood that the axial shaft seal ring is arranged on the shaft in a fixed position in the axial direction.

The shaft can be designed as a motor shaft, in particular of an electric motor.

Further advantages of the invention result from the description and the drawing. In the following, the invention is explained in more detail by means of embodiments shown in the drawing. The embodiments shown and described are not to be understood as an exhaustive enumeration but rather have exemplary character for the description of the invention.

DETAILED DESCRIPTION OF THE PREFERRED EMBODIMENTS

Figure 1:
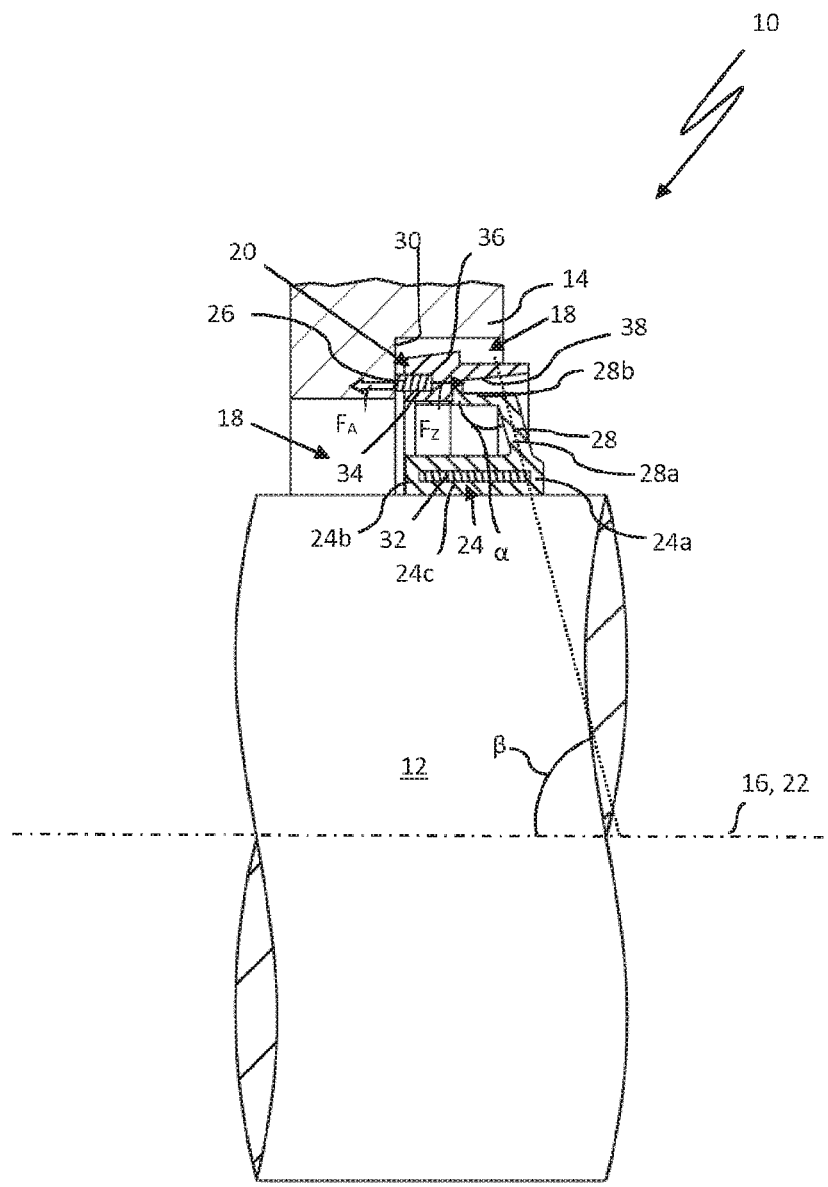
FIG. 1 is a sealing arrangement having a shaft, a shaft housing and an axial shaft seal ring for sealing a sealing gap formed between the shaft and the shaft housing, wherein the axial shaft seal ring has a holding portion arranged to be statically sealed on the shaft and a sealing portion, which abuts in a sealing manner against a sealing surface of the shaft housing in axial direction and which is connected to the holding portion via a sealing membrane, wherein the sealing membrane can be activated by centrifugal forces and, in order to relieve the sealing portion, with the shaft at rest, i.e. not rotating, in a sectional view.

FIG. 1 shows a sealing arrangement 10 having a shaft 12 and having a machine part designed here as a shaft housing 14. The shaft 12 can be rotated relative to the shaft housing 14 around a rotational axis marked with 16. A sealing gap 18 is formed between the shaft 12 and the shaft housing 14. The sealing gap 18 is sealed by an axial shaft seal ring 20, the central axis 22 of which coincides with the rotational axis 16 of the shaft 12. In FIG. 1 the axial shaft seal ring 20 is shown with the shaft 12 at rest or stationary.

The axial shaft seal ring 20 has a foot or holding portion 24 and a sealing portion 26, which are connected to each other via a sealing membrane 28.

The sealing portion 26 abuts a counter or sealing surface 30 of the shaft housing 14 in an axial direction to the rotational axis 16. It is understood that the sealing surface 30 can also be formed on a machine part that is separate from the shaft housing 14 according to an embodiment not shown in detail in the drawing.

The axial shaft seal ring 20 is arranged on the shaft 12 via the holding portion 24 in a rotationally fixed manner and held in a fixed position in the axial direction. As a result, the axial shaft seal ring can rotate together with the shaft 12 around the rotational axis 16 relative to the shaft housing 14. The holding portion 24 of the axial shaft seal ring 20 abuts the shaft 12 in a statically sealing manner. The holding portion 24 can be provided with a tensioning or holding ring 32, by means of which the holding portion 24 is held on the shaft 12 in a radial press fit. The holding portion 24 can be arranged additionally or alternatively also held in an axial press fit on the shaft 12.

The sealing membrane 28 is formed on the holding portion 24 and extends outwards from the holding portion 24 in a radial direction to the central axis of the axial shaft seal ring 20. The sealing membrane 28 acts as a spring or pretensioning member by which the sealing portion 26 is elastically pretensioned in the axial direction against the sealing surface 30 by means of a pressing force $F_A$. The sealing membrane 28 has a holding portion-side membrane segment 28a and a sealing portion-side membrane segment 28b. Here, the two segments are angled against each other and together form an angle α of, here, approximately 105°. The angle α can also be larger or smaller than 105°. The holding portion-side membrane segment 28a is arranged substantially radially to the rotational axis 16. The sealing portion-side membrane segment 28b is arranged substantially axially to the rotational axis 16.

The sealing membrane 28 can be formed on the end portion 24a of the holding portion 24 pointing away from the sealing surface according to the embodiment shown in FIG. 1. This ensures a sufficiently large axial preload of the sealing portion 26 against the sealing surface 30 in a particularly compact size of the axial shaft seal ring 20. However, it is to be noted that the sealing membrane 28 can also be formed on the end portion 24b facing the sealing surface 30 or in a central portion 24c of the holding portion 24 arranged between the two end portions 24a, 24b. The sealing membrane encloses an angle β of about 75° with the rotational axis 16 of the shaft here as an example.

The sealing portion 26 can be formed on the sealing membrane 28 and can be formed integrally with it or, according to the embodiment shown in FIG. 1, be designed as a separate component from the sealing membrane 28.

The ring-shaped sealing portion can be arranged in a holding groove 34 of a support ring 36. The support ring 36 consists of a material that is, compared to the material of the sealing membrane 28 and preferably also the sealing portion 26, less elastically deformable or dimensionally stable. The support ring 36 can thus counteract undesired expansion of the sealing portion 26 of the axial shaft seal ring 20 during rotation of the shaft 12. This means that the sealing membrane 28 is more deformable in the radial direction by centrifugal forces $F_R$ resulting from the rotation of the shaft 12 than the sealing portion 26. Due to the aforementioned reinforcement of the sealing portion 26, it can be made of a rubber-elastic or a viscoplastic deformable material, if required. Polyolefin materials such as polytetrafluoroethylene (PTFE), polyurethane (PU) or other sealing materials familiar to those skilled in the art, such as metal or ceramic, are particularly suitable materials. The support ring 36 and the sealing portion of the axial shaft seal ring 20 can, for example, be manufactured using the 2K method. The sealing portion 26 can be formed integrally with the sealing membrane 28 according to an embodiment not shown in detail in the drawing. According to FIG. 1 the support ring 36 can surround the sealing membrane 28 in a radial direction and form a stop or support surface 38 for the sealing membrane 28.

Figure 2:
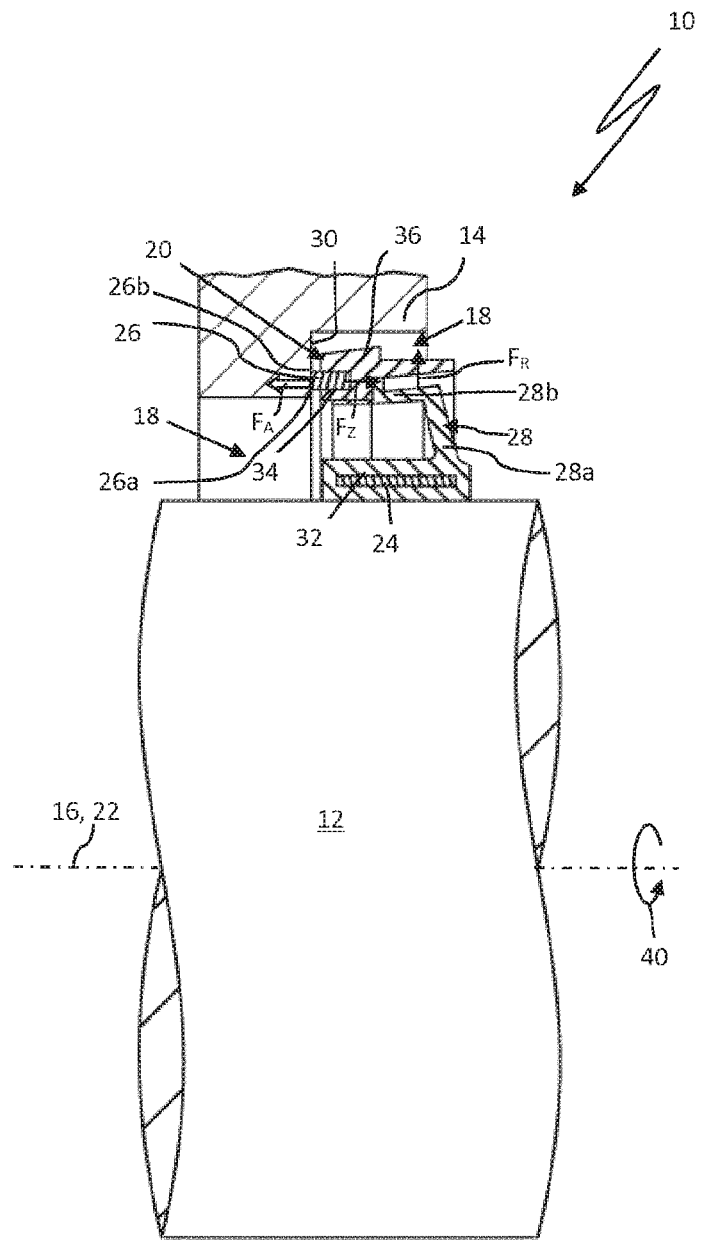
FIG. 2 is the sealing arrangement according to FIG. 1 with the shaft rotating and the sealing membrane activated by centrifugal force acting on the sealing membrane for axially directed relief of the sealing portion of the axial shaft seal ring relative to the sealing surface, in a sectional view.

In FIG. 2 the sealing arrangement 10 is shown in the operating state with the shaft rotating. The axial shaft seal ring 20 rotates relative to the shaft housing 14 in the direction of a rotational direction marked with 40 around the rotational axis 16. A centrifugal force $F_R$ derived from the rotational movement of the axial shaft seal ring 20 acts on the sealing membrane 28. This centrifugal force $F_R$ causes an expansion of the sealing membrane 28 in a radial direction. This expansion is supported or enabled by special spatial structure areas of the sealing membrane 28, which act as a circumferential reserve of the sealing membrane 28. The spatial structure areas described above will be discussed in detail below.

The sealing portion 26 of the axial shaft seal ring 20, which is stiffened in the radial direction by the support ring 36, cannot expand in the radial direction or can expand only slightly. The sealing portion 26 and the support ring 36 are consequently subjected to an axially directed pull force $F_Z$ by the radially deformed sealing membrane 28. This pull force $F_Z$ points away from the sealing surface 30 and is therefore counter to the pressing force $F_A$ with which the sealing portion 26 is pressed by the sealing membrane 28 in the axial direction against the sealing surface 30. This relieves the pressure on the sealing portion 26 which abuts tightly against the sealing surface 30. A contact surface pressure between the sealing portion 26 and the sealing surface 30 is therefore reduced.

Figure 3:
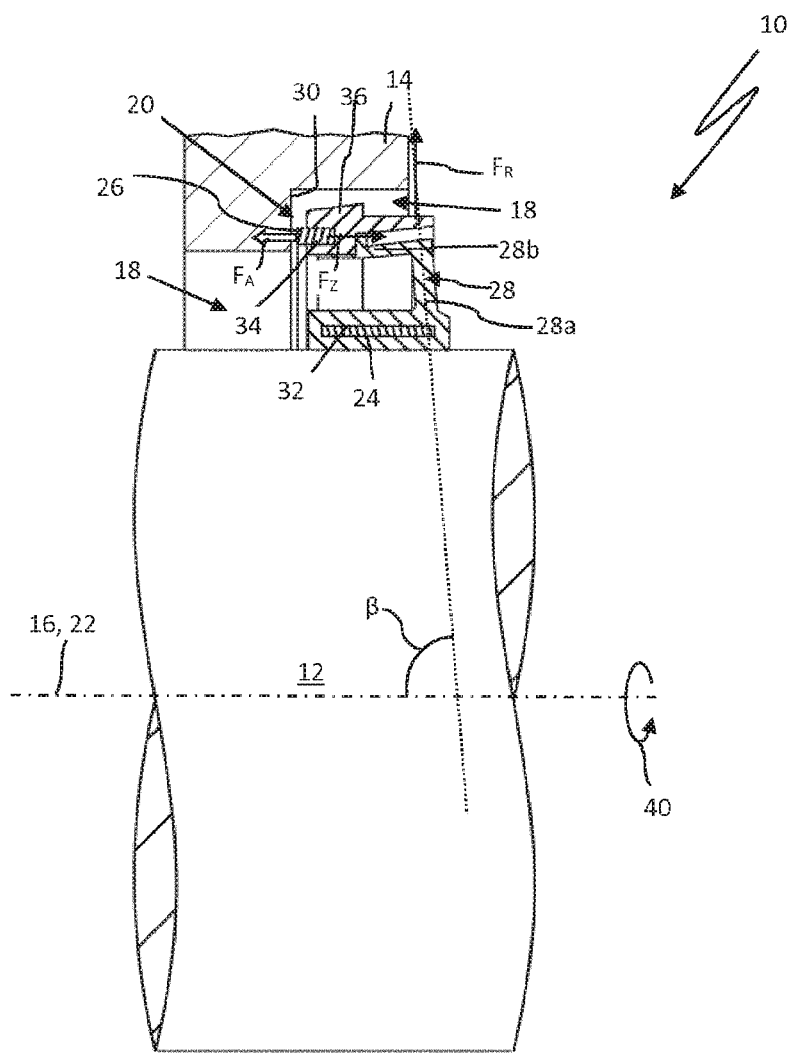
FIG. 3 is the sealing arrangement according to FIG. 1 at maximum rotational speed of the shaft and having the sealing portion spaced from the counter surface in the axial direction, which results in a cancellation of the force $F_A$.

The magnitude of the centrifugal force $F_Z$ acting on the sealing membrane 28 depends on the rotational speed of the shaft 12. If the rotational speed increases, the centrifugal force $F_R$ acting on the elastically deformable sealing membrane 28 increases and with it the degree of deformation of the sealing membrane 28. If the rotational speed drops, the centrifugal forces $F_R$ are reduced accordingly and the sealing membrane 28 deforms back automatically towards the initial or neutral position thereof shown in FIG. 1. Overall, this results in a rotational speed-dependent relief of the sealing portion 26 in the axial direction. It is important to ensure that the sealing portion 26 is not moved in a radial direction along the sealing surface 30 when the rotational speed of the shaft 12 changes. Hence, the sealing portion 26 or the sealing edges 26a, 26b thereof are subjected to less mechanical stress. If necessary, the sealing membrane 28, in particular the aforementioned spatial structure areas thereof, can be designed in such a manner that the pull force $F_Z$ exceeds the pressing force $F_A$ of the sealing membrane 28 acting on the sealing portion 26 when the shaft 12 reaches a specified rotational speed. In this case the sealing portion 26 is moved away from the sealing surface 30 in (strictly) axial direction. The sealing portion 26 of the axial shaft seal ring 20 is therefore spaced apart from the sealing surface 30 when the specified rotational speed of the shaft 12 is reached, as shown in FIG. 3. In this case $F_A=0$ applies for $F_A$.

The constructional design of the axial shaft seal ring can therefore reliably counteract friction-related mechanical and thermal overloading of the sealing portion 26. The axial shaft seal ring 20 can therefore be used even at extremely high rotational speeds of the shaft 12 of, for example, up to 40,000 rpm. Due to the functional principle of the axial shaft seal ring 20, the lifespan of the shaft seal ring 20 can be significantly improved.

Figure 4:
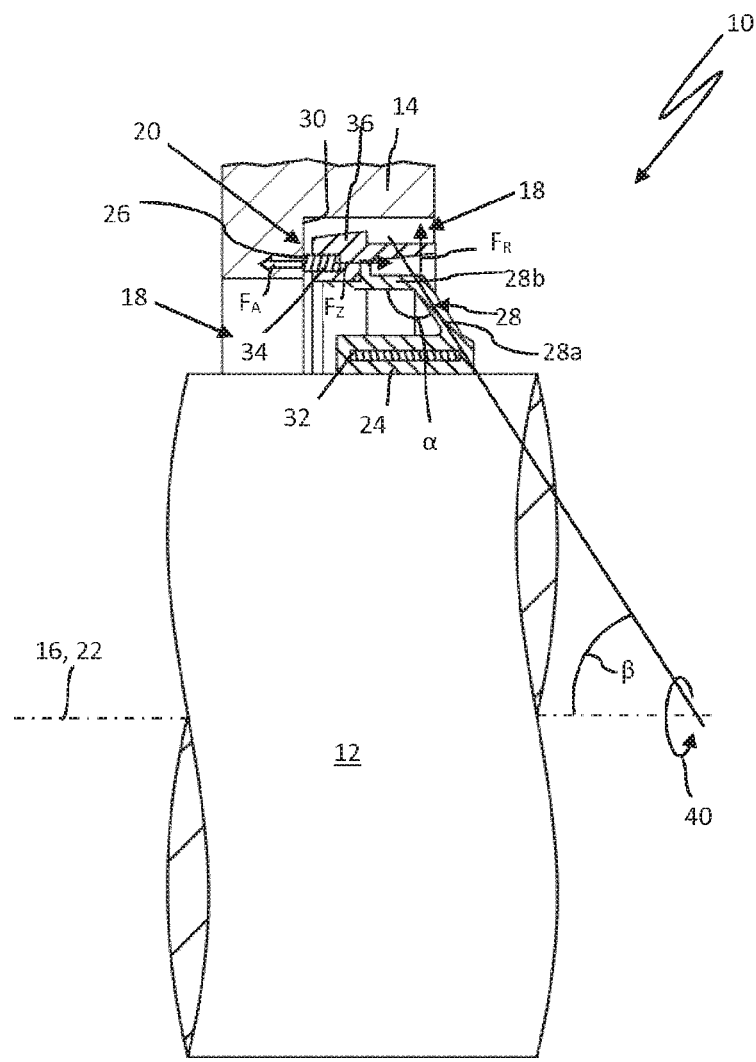
FIG. 4 is a further sealing arrangement in which the sealing membrane of the axial shaft seal ring in the neutral position thereof has a different shape than the sealing membrane shown in FIG. 1, with the shaft at rest and in a sectional view.

FIG. 4 shows a further embodiment of the sealing arrangement 10. The axial shaft seal ring 20 is shown here in the stationary operating state of the shaft 12, i.e. in the neutral state thereof. In this operating state, the sealing membrane 28 forms a more acute angle β with the rotational axis 16 than is the case with the sealing arrangement 10 shown in FIG. 1. The angle β here is approximately 60°. The angle α is approximately 120°.

The extension of the sealing membrane 28 in the radial direction is smaller than the extension of the sealing membrane 28 in the axial direction. The ratio of the radial extension to the axial extension of the sealing membrane 28 can in particular be (approximately) 5:7.

With the sealing arrangements 10 described above, the sealing membrane 28 can alternatively also be designed convexly bent radially outwards. In this case the two membrane segments 28a, 28b are therefore not angled against each other. In addition, the sealing portion 26 and the sealing membrane 28 of the axial shaft seal ring 20 can be formed integrally. The support ring 36 and the sealing portion 26 can be bonded together, as a 2K component or otherwise attached to each other.

FIGS. 5 to 12 show various embodiments of the sealing membrane 28 of an axial shaft seal ring shown in connection with the FIGS. 1 to 4 with different spatial structure areas in a sectional and exempted representation.

Figure 5:
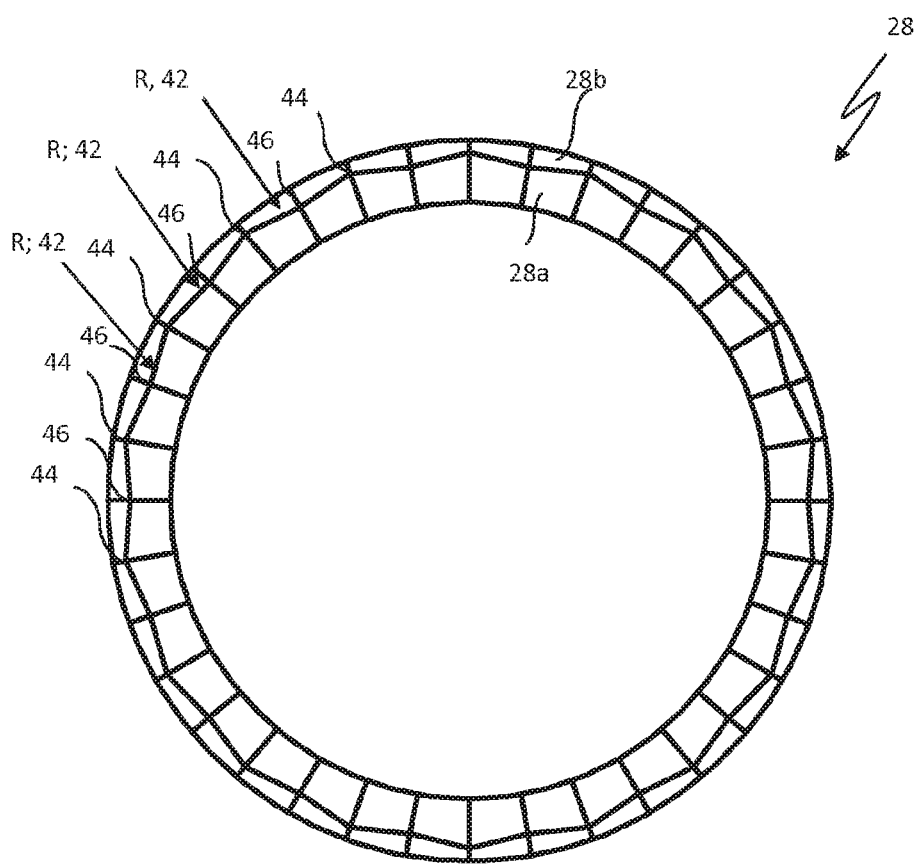
FIG. 5 is an embodiment of a sealing membrane of an axial shaft seal ring as shown in FIGS. 1 to 4, in a sectional side view.
Figure 6:
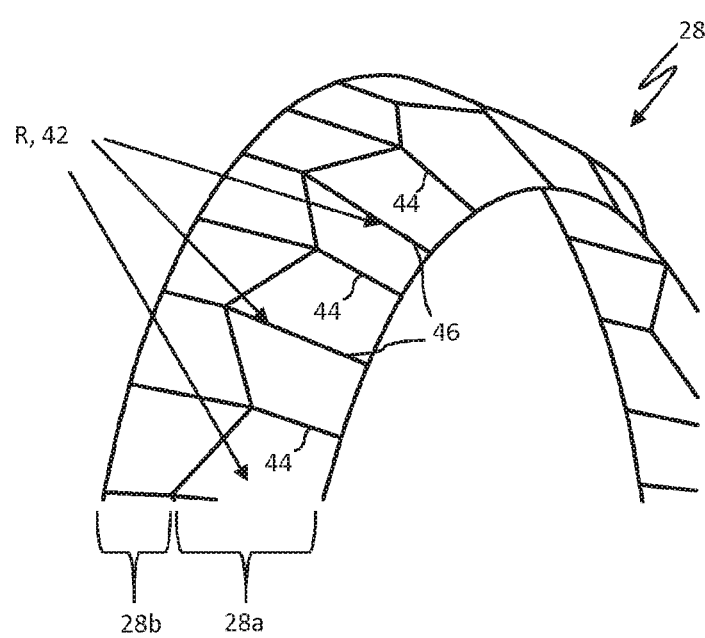
FIG. 6 is the sealing membrane according to FIG. 5 in a perspective partial view.

In FIGS. 5 and 6, the sealing membrane 28 of an axial shaft seal ring 20 is shown with the holding portion-side membrane segment 28a and the sealing portion-side membrane segment 28b in an exempted view. The spatial structure areas R of the sealing membrane 28 according to FIGS. 5 and 6 are designed in the shape of folds 42 of the sealing membrane 28, which are arranged one behind the other in the circumferential direction of the sealing membrane 28. This type of folding of the sealing membrane 28 corresponds to a so-called leporello or zigzag folding of the sealing membrane 28 in circumferential direction. 44 is the first membrane hinge and 46 is the second membrane hinge of the sealing membrane 28. The membrane hinges 44, 46 can each extend over the entire or substantially the entire sealing membrane 28.

The first membrane hinges 44 of the second membrane segment 28b are arranged further out in radial direction than the second membrane hinges 46. In the area of the first holding portion-side membrane segment 28a, the first membrane hinges 44 are spaced further apart from the sealing portion 26 in the axial direction than the second membrane hinges 46.

Due to the folds 42 of the sealing membrane 28, it can "unfold," i.e. expand in radial direction, under the influence of the centrifugal force $F_R$ caused by the rotation of the shaft 12 (FIG. 1). Due to the elastic resilience inherent in the material of the sealing membrane 28, it can automatically deform back from the unfolded state to the neutral state thereof (by resting shaft) as shown in FIGS. 5 and 6.

Figures 7, 8:
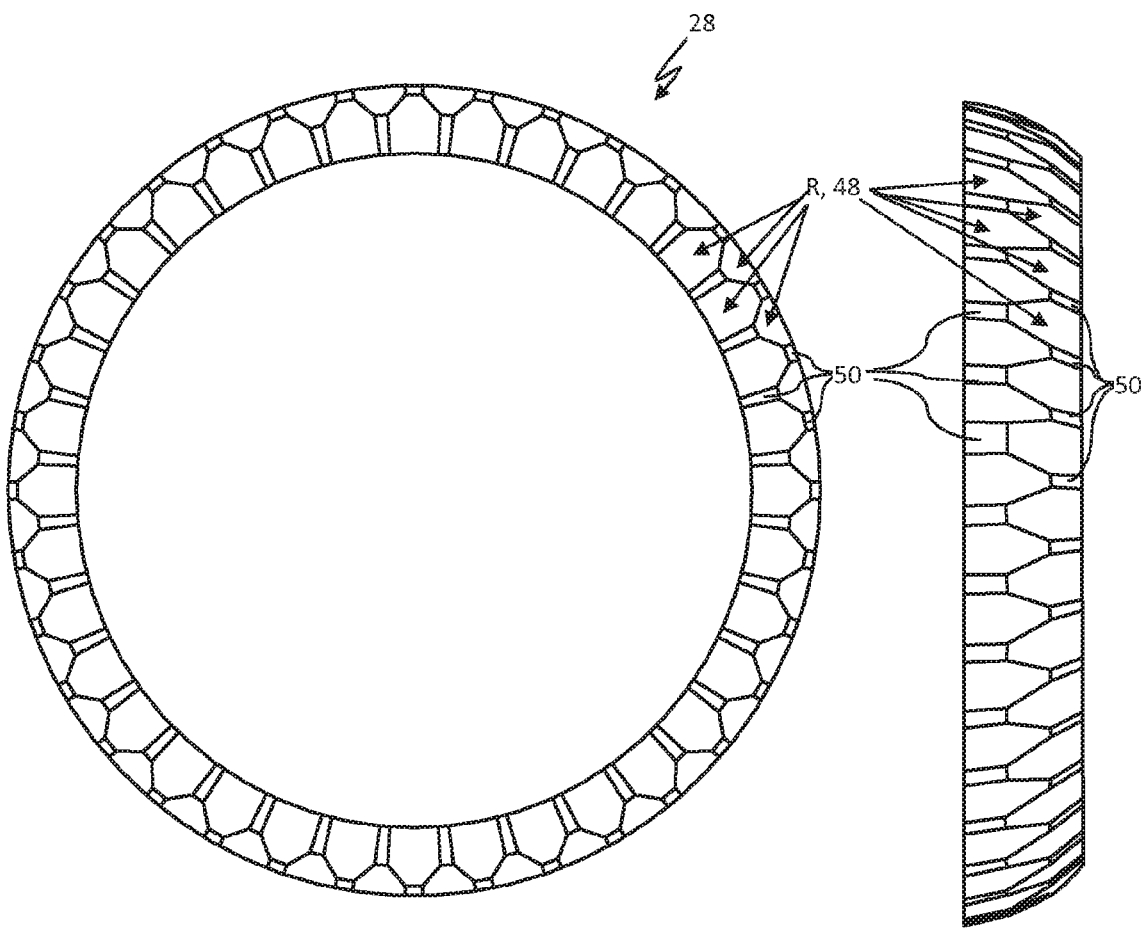
FIG. 7 is a further embodiment of a sealing membrane of an axial shaft seal ring as shown in FIGS. 1 to 4, in a sectional side view.
FIG. 8 is the sealing membrane according to FIG. 7 in a further sectional side view.
Figure 9:
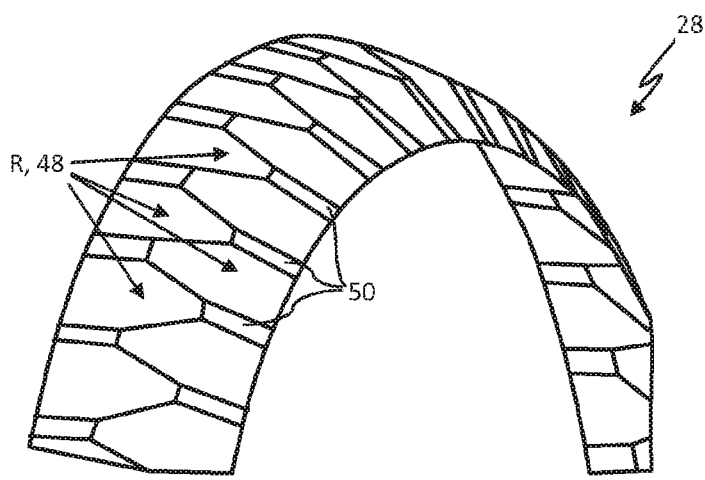
FIG. 9 is the sealing membrane according to FIG. 7 in a sectional detailed perspective view.

According to the sealing membrane 28 shown in sections in FIGS. 7 to 9, the spatial structure areas R, through which a circumferential reserve of the sealing membrane 28 is effected, may comprise a large number of trough-shaped recesses 48 on the outside of the sealing membrane 28. The recesses 48 can each have a polygonal basic shape. Between the recesses 48, there may be membrane webs 50 arranged in the circumferential direction of the axial shaft seal ring 20, which provide a locally limited stiffening of the sealing membrane. This allows the sealing membrane 28 to be stabilized in a predetermined shape, in particular when the shaft 12 of the sealing arrangement 10 (see FIG. 1) is at rest. The recesses 48 of the two membrane segments can alternately engage, i.e. comb with each other, in the circumferential direction of the axial shaft seal ring 20 (FIG. 1).

Figure 10:
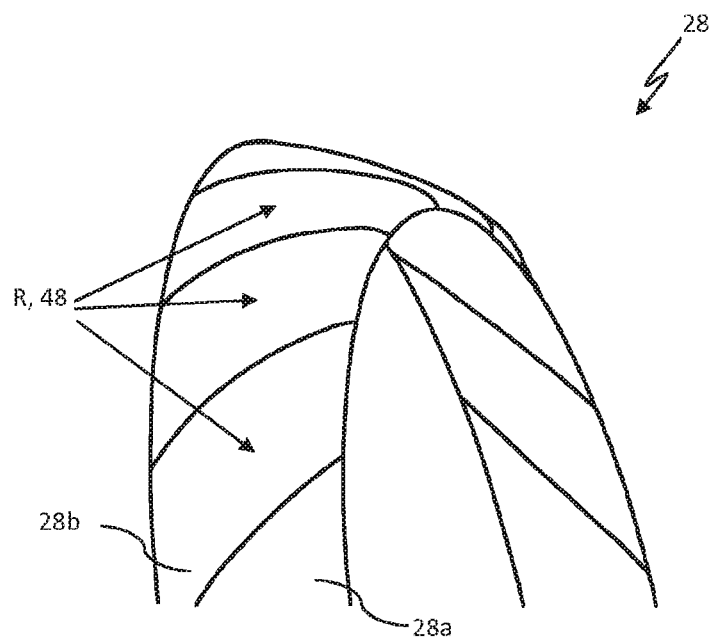
FIG. 10 is a further embodiment of a sealing membrane of an axial shaft seal ring as shown in FIGS. 1 to 4, in a sectional detailed perspective view.

According to the sealing membrane 28 shown in FIG. 10, the recesses 48 of the sealing membrane 28 can also be designed spirally at least in sections.

Figures 11, 12:
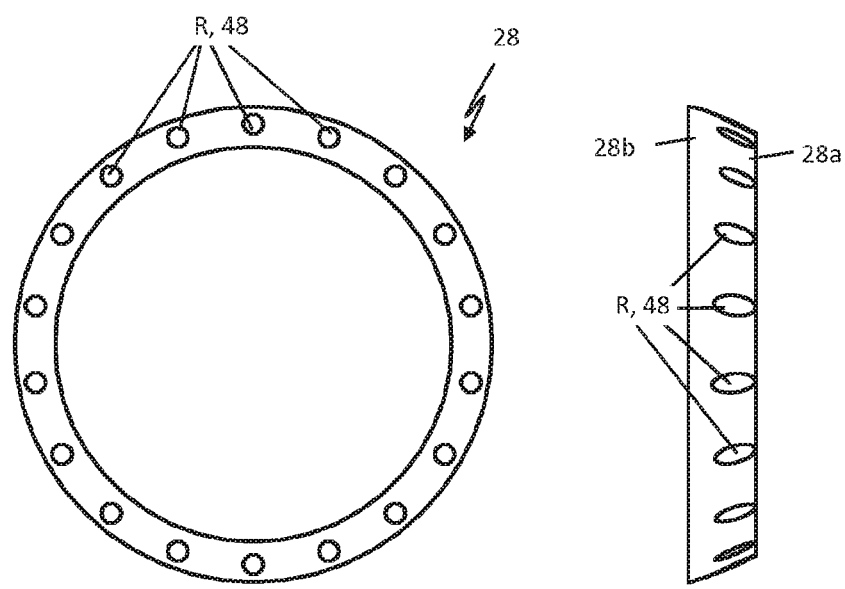
FIG. 11 is a further embodiment of a sealing membrane of an axial shaft seal ring as shown in FIGS. 1 to 4, in a sectional side view
FIG. 12 is the sealing membrane according to FIG. 11 in a sectional side view.

In the sealing membrane 28 shown in FIGS. 11 and 12 (in neutral position), the spatial structure areas R comprise individual recesses 48 of the sealing membrane 28 having an oval, here elliptical, basic shape. The recesses 48 are arranged spaced apart in the circumferential direction of the axial shaft seal ring 20 (FIG. 1), preferably regularly. The spatial structure areas R may comprise protrusions or bulges of the sealing membrane 28 instead of the recesses 48 shown in FIGS. 11 and 12.

Figure 13:
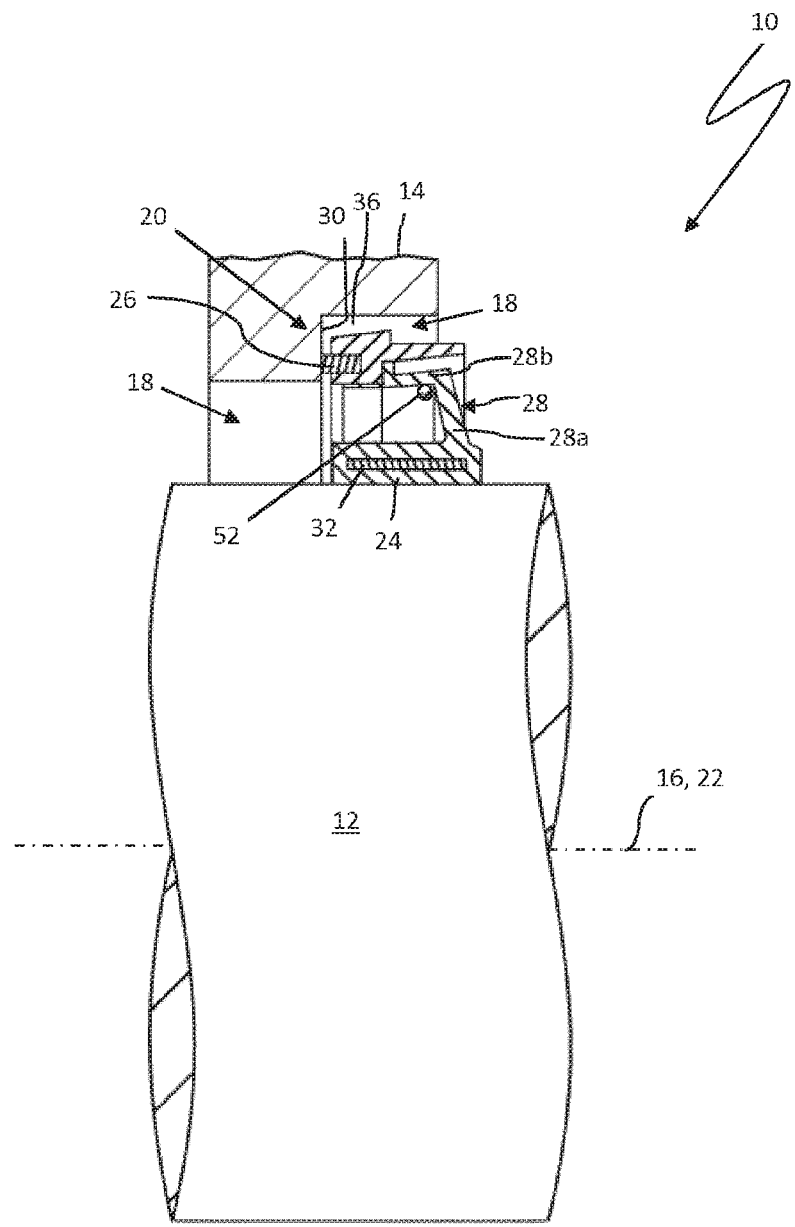
FIG. 13 is a sealing arrangement in which the sealing membrane of the axial shaft seal ring is provided with an additional mass member on the inner side thereof, in a sectional view.

According to the embodiment of the sealing membrane 28 shown in FIG. 13, the response of the sealing membrane 28 to rotational speed changes of the shaft 12 can be further improved by a single mass member 52 or also by a plurality of mass members 52, which is/are arranged on the sealing membrane 28. The mass member(s) 52 can be fastened to the inside or outside of the sealing membrane 28 or at least in sections embedded in the material of the sealing membrane 28. The single mass member 52 for example could be ring-shaped and in particular could be made of an elastomer. Where a plurality of mass members 52 are provided, they may be made of any material, in particular metal. If required, the mass members can be mechanically coupled to each other by elastomeric connecting parts (not shown), which are designed separately from the sealing membrane 28. By using one mass member 52 or a plurality of mass members 52, the spectrum of materials suitable for the sealing membrane 28 can be extended and/or the sealing membrane 28 can be realized with a modified, i.e. smaller or larger, wall thickness. As a result, the possible application range of the axial shaft seal ring 20 or the sealing arrangement 10 can be further extended.

What is claimed is:

1. An axial shaft seal ring, comprising:
   a holding portion, which can be arranged in a statically sealing manner on a shaft rotatable around a rotational axis; and
   a sealing portion for a dynamically sealing abutment against a sealing surface in an axial direction relative to a central axis of the axial shaft seal ring;
   wherein the holding portion and the sealing portion are connected to each other via an elastically deformable sealing membrane which extends from the holding portion in a radial direction towards the sealing portion and by means of which the sealing portion can be pretensioned against the sealing surface with a pressing force $F_A$;
   wherein the sealing membrane has a plurality of spatial structure areas R in the circumferential direction of the shaft seal ring, which serve as a circumferential reserve of the sealing membrane;
   wherein an expansion of the sealing membrane in a radial direction is effected in the spatial structure areas R by a centrifugal force $F_R$, which is accompanied by a rotational movement of the shaft seal ring around the central axis thereof and acts on the sealing membrane, in such a manner that the sealing portion is acted upon by the sealing membrane with an axially directed pull force $F_Z$, which is directed opposite to the pressing force $F_A$;
   wherein the sealing portion is dimensionally stable or stabilized in the shape thereof in comparison with the sealing membrane with respect to the centrifugal forces $F_R$ occurring during the operational use of the axial shaft seal ring, wherein the sealing portion of the axial shaft seal ring is stiffened by a support ring in order to counteract a radial expansion of the sealing portion during a rotational movement of the axial shaft seal ring around the central axis thereof.

2. The axial shaft seal ring according to claim 1, wherein the spatial structure areas R comprise folds of the sealing membrane.

3. The axial shaft seal ring according to claim 1, wherein the spatial structure areas R comprise recesses and/or bulges of the sealing membrane.

4. The axial shaft seal ring according to claim 3, wherein the recesses at least partially have a polygonal, an elliptical, an oval or a circular basic shape.

5. The axial shaft seal ring according to claim 1, wherein the support ring surrounds the sealing portion on the outside in a radial direction.

6. The axial shaft seal ring according to claim 5, wherein the sealing portion and the support ring are formed integrally with one another, bonded together or are formed as a multi-component injection-molded part.

7. The axial shaft seal ring according to claim 5, wherein the sealing portion is arranged clamped and held clamped in the support ring.

8. The axial shaft seal ring according to claim 1, wherein the holding portion, the sealing membrane and the sealing portion are formed integrally with one another.

9. The axial shaft seal ring according to claim 1, wherein the support ring is made of a plastic material, of metal, of ceramic or of a composite material.

10. The axial shaft seal ring according to claim 1, wherein the sealing membrane, on the inside in the radial direction, is provided with at least one mass member, with a plurality of mass members, by means of which the radial expansion of the sealing membrane is assisted during a rotational movement of the shaft seal ring.

11. The axial shaft seal ring according to claim 1, wherein the holding portion comprises a tensioning or holding ring.

12. The axial shaft seal ring according to claim 1, wherein the sealing portion has at least one sealing edge or a plurality of sealing edges.

13. The axial shaft seal ring according to claim 1, wherein the sealing membrane consists of a viscoplastic or of a rubber-elastic deformable material.

14. A sealing arrangement comprising a shaft housing and the shaft rotatable relative to the shaft housing around the rotational axis, and the axial shaft seal ring according to claim 1 for sealing a sealing gap formed between the shaft housing and the shaft, wherein the axial shaft seal ring is mounted non-rotatably on the shaft and abuts sealingly with the sealing portion thereof against the sealing surface of the shaft housing in the axial direction relative to the central axis of the shaft seal ring.

15. The sealing arrangement according to claim 14, wherein the sealing membrane is associated with a stop surface, on which the sealing membrane of the shaft seal ring is supported radially on the outside when the shaft reaches a predetermined rotational speed.

* * * * *

UNITED STATES PATENT AND TRADEMARK OFFICE
CERTIFICATE OF CORRECTION

PATENT NO. : 11,255,439 B2
APPLICATION NO. : 16/946980
DATED : February 22, 2022
INVENTOR(S) : Martin Franz, Christoph Schuele and Christoph Wehmann It is certified that error appears in the above-identified patent and that said Letters Patent is hereby corrected as shown below:

On the Title Page

Item (56) In the References Cited, Foreign Patent Documents, second Column:
"DE 343 813 C" should read --DE 843 813 C--, and
"DE 32 01 556 U1" should read --DE 92 01 556 U1--.

Signed and Sealed this
Thirteenth Day of September, 2022

Katherine Kelly Vidal
*Director of the United States Patent and Trademark Office*